United States Patent Office 3,264,081
Patented August 2, 1966

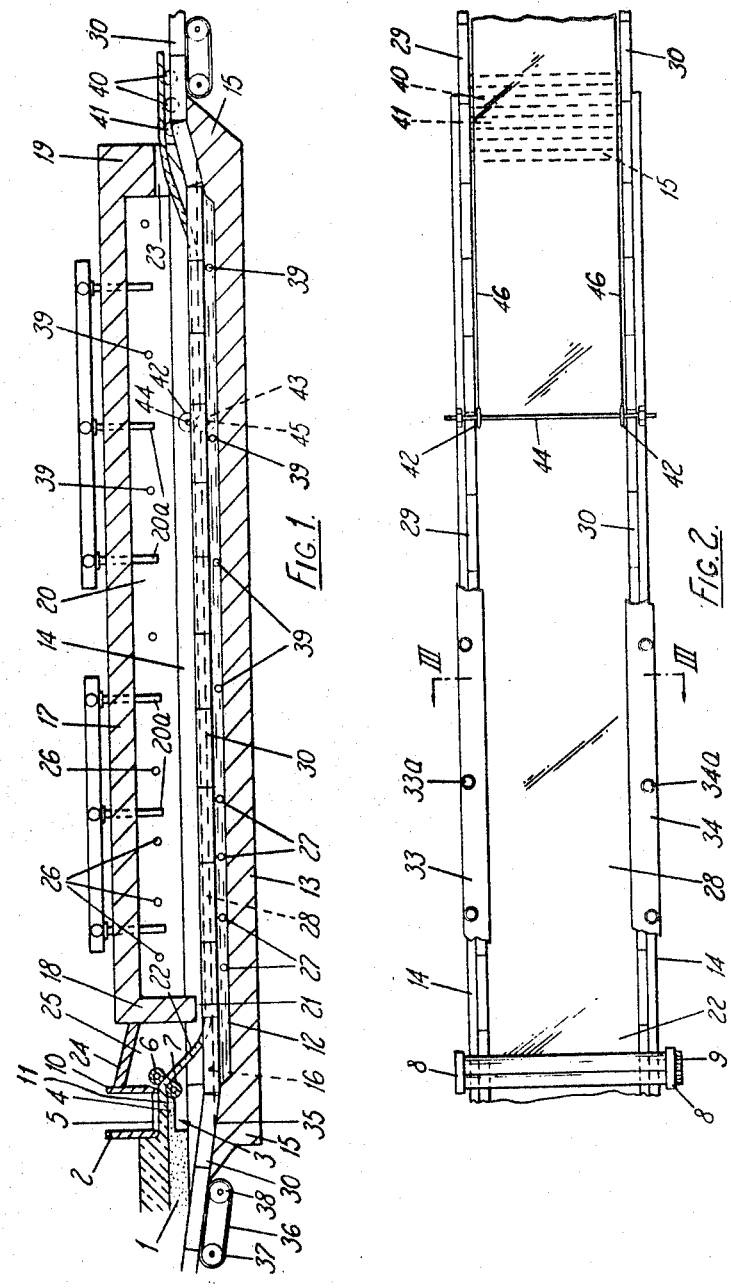

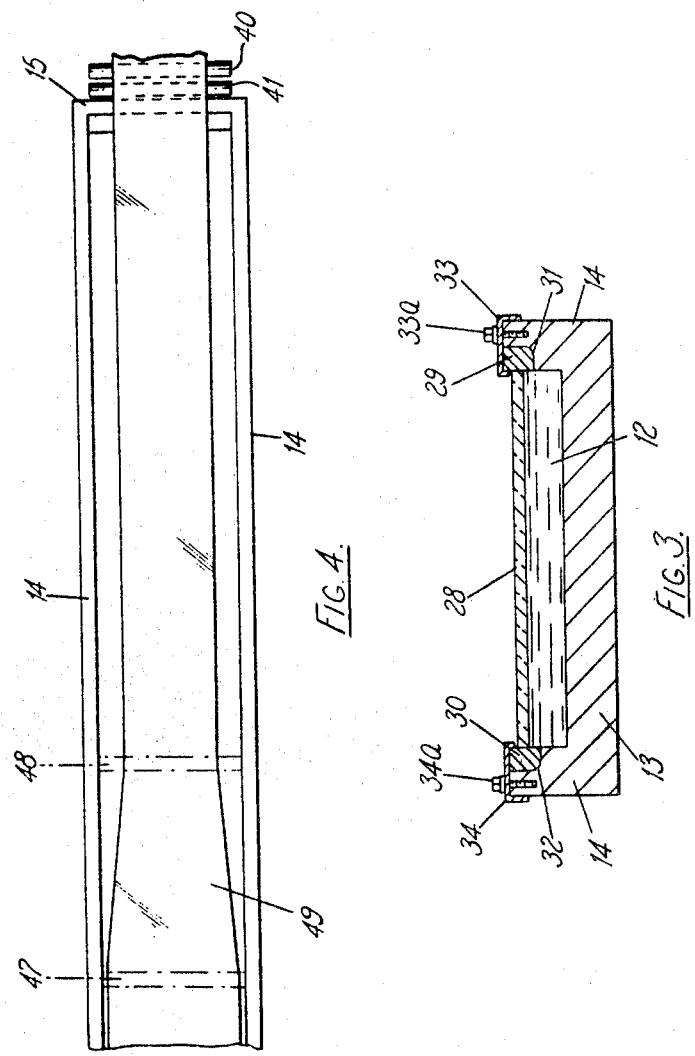

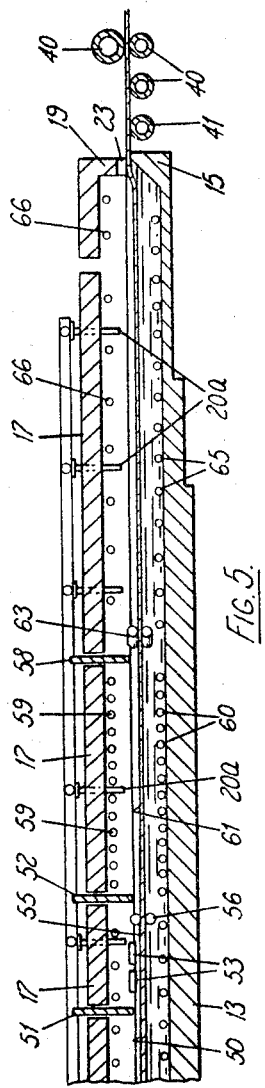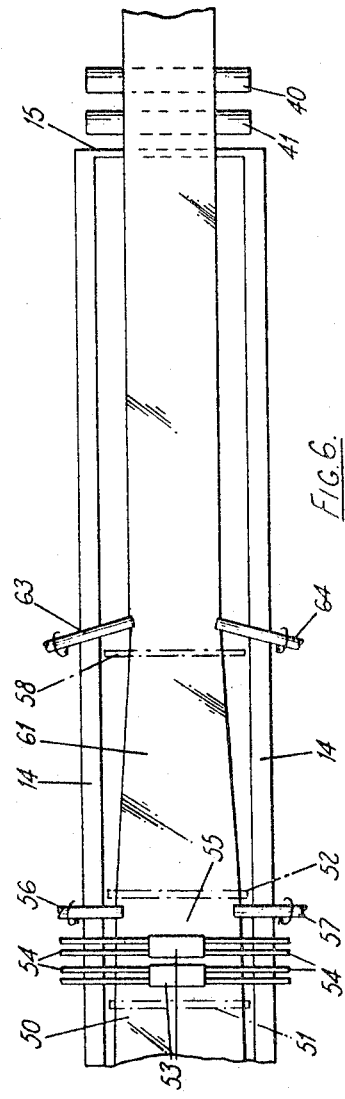

3,264,081
MANUFACTURE OF FLAT GLASS
Lionel A. B. Pilkington, Rainhill, England, assignor to Pilkington Brothers Limited, Liverpool, England, a corporation of Great Britain
Filed Mar. 26, 1962, Ser. No. 182,282
Claims priority, application Great Britain, Mar. 29, 1961, 11,587/61
2 Claims. (Cl. 65—99)

This invention relates to the manufacture of flat glass.

In the manner of manufacture of flat glass in ribbon form by the usual rolling methods, imperfections of the roller surfaces are imparted to the surfaces of the glass as well as variations in thickness, sometimes referred to as "distortions" due to asymmetry in one or both of the rolls.

In the manufacture of flat glass in ribbon form by the usual vertical drawing methods, the glass produced has a lustrous finish but distortions occur in the drawn sheet as a result of temperature differences existing in the glass before the sheet has set. The process of vertically drawing flat glass is considerably slower than the process of producing flat glass by the usual rolling method.

In the usual rolling methods the thickness of the glass produced is determined by the relative setting of the casting rolls, which rolls are sometimes referred to as "sizing rolls;" and in the usual method of vertically drawing flat glass the rate of production is entirely dependent on the viscosity of the glass about the line of draw in the body of molten glass from which the sheet is vertically drawn.

A main object of the present invention is to facilitate production of flat glass, at least at the rate at which rolled flat glass is produced, in different thicknesses, and with at least the lustrous finish of vertically drawn flat glass, which drawn glass is usually referred to as "sheet glass" or "window glass."

A method of manufacturing flat glass in ribbon form according to the invention is characterised by delivering glass at a controlled rate to a molten bath to establish a buoyant layer of molten glass on the bath confined between and engaging surfaces extending lonigtudinally of the bath, advancing the buoyant layer along the bath, simultaneously advancing the surfaces with the glass along the bath to maintain a uniform velocity across the whole width of the layer, and then cooling the layer sufficiently to enable it to be taken in ribbon form unharmed from the bath.

In a preferred embodiment of the invention the longitudinally extending surfaces are surfaces of a material wettable by the molten glass, so that the sides of the buoyant layer of glass are carried along the bath by the wettable surfaces at substantially the same velocity as that of the glass in the centre of the layer and there is in substance a uniform velocity along the bath across the width of the layer of molten glass.

Preferably in carrying out the present invention the molten bath is so constituted as to have all the characteristics as fully described in the United States of America Patent No. 2,911,759.

In accordance with the invention the layer of molten glass may be cooled as it is advanced to a state in which the glass is sufficiently stiff to hold its form, the wettable surfaces then being detached from the glass to enable the glass to be advanced in ribbon form independently of the wettable surfaces, the glass being further cooled sufficiently to enable it to be taken in ribbon form unharmed from the molten bath.

In such a method the wettable surfaces would be taken from the bath independently of the glass and may be taken from the bath either at the outlet end of the bath or at some intermediate point along the length of the bath.

In the production of flat glass in ribbon form according to the invention as already described, the ribbon of glass taken from the bath has in substance the dimensions of the layer of molten glass constituted between the wettable surfaces, but the invention also comprehends modifying the thickness of the glass as it is advanced.

The reduction of the glass to a desired thickness may be accompanied by a reduction in width, but the width of the glass constituting the buoyant layer of molten glass can be wholly or partially retained in the ribbon of glass taken from the bath by the application of tensile forces developed transversely of the ribbon in the plastic state while the longitudinally directed tractive force is applied to the plastic ribbon to effect the desired reduction in thickness.

The invention also comprehends flat glass produced by any of the above described methods, and articles worked up from said flat glass.

Further the invention comprehends apparatus for manufacturing flat glass of desired thickness from a layer of molten glass, comprising a tank structure containing a molten bath, the side walls of the tank comprising at least at the surface level of the bath mobile surfaces for engagement by the molten glass, which surfaces are movable along the tank at a constant speed, means for delivering glass at a controlled rate to the bath and advancing the glass along the bath as a layer of molten glass extending between said mobile surfaces, driving means to advance said surfaces along the tank at the same speed as that of the molten glass to maintain uniform velocity of the glass across the whole width of the layer, and thermal regulators in the bath to cool the glass as it is advanced until it can be taken unharmed from the bath. The movable surfaces may be surfaces which are wettable by molten glass.

In one embodiment of the invention the side walls of the tank are formed with longitudinally extending grooves at the surface level of the bath and the tiles are arranged to be advanced simultaneously along each groove.

Alternatively the wettable surfaces may be constituted by a series of wettable tiles which are advanced along the side walls of the tank, being held against the ungrooved side walls by guides fixed to the side walls.

If the ribbon of glass taken from the bath is discharged on to ordinary lehr rollers then the tiles may be detached from the ribbon before it is taken from the bath and to effect this severing means may be mounted in the tank near the outlet end for detaching the tiles from the cooled glass after the glass has been cooled sufficiently to be taken unharmed from the bath.

Alternatively if the thickness of the glass is to be reduced by controlled attenuation the severing means is mounted in the tank where the glass is sufficiently stiff to hold its form so that the attenuation of the glass can be effected without any restriction due to the attachment of the glass to the tiles.

In order that the invention may be more clearly understood some embodiments thereof will now be described, by way of example, with reference to the accompanying diagrammatic drawings in which:

FIGURE 1 is a sectional elevation of apparatus according to the invention comprising a tank structure confining a bath of molten metal, a roof structure over the tank structure and apparatus for delivering a rolled ribbon of glass at a controlled rate on to the bath surface between mobile surfaces, FIGURE 2 is a plan view of the tank structure of the apparatus of FIGURE 1, FIGURE 3 is a section on line III—III of FIGURE 2, FIGURE 4 is a plan view of the tank structure showing one way of reducing the thickness of a ribbon of glass when mobile wettable surfaces have been severed from the ribbon, FIGURE 5 is a part elevation illustrating a second method of reducing the thickness of the ribbon of glass, and FIGURE 6 is a plan view of the apparatus of FIGURE 5.

In the drawings like references indicate the same or similar parts.

Referring to FIGURES 1 and 2 of the drawings a forehearth of a continuous glass melting furnace is indicated at 1, a regulating tweel at 2 and a spout at 3, the spout comprising a floor or "lip" 4 and side jambs 5, the side jambs 5 and lip 4 forming a spout of generally rectangular cross-section. In known manner a cover can be secured over the spout.

Operatively associated with the spout are a pair of water cooled casting rolls, the upper one of which is indicated at 6 and the lower one at 7. The casting rolls are mounted in frames 8 in usual manner and are driven through toothed wheels 9 by power means, not shown.

A gate 10 is adjustably suspended in known manner in a vertical plane in contiguity with the upper casting roll 6. The gate 10 shields the upper roll from heat radiated from the molten glass 11 flowing from the forehearth 1 over the lip 4 of the spout 3 to the pass between the casting rolls 6 and 7.

The upper casting roll 6 is disposed slightly in advance of the lower casting roll 7 so that the molten glass 11 flows from the lip 4 on to the upper part of the roll 7 which thus presents to the glass a downwardly and forwardly directed arcuate casting bed moving in the same direction as the flow of glass 11 from the spout. Thus the molten glass 11 on leaving the spout and arriving on this casting bed is constrained to flow forwardly thereby preventing backward flow of molten glass under the spout 3.

The ribbon forming means comprising casting rolls 6 and 7 just described is disposed over one end of a tank structure which contains a bath 12 of molten metal, for example, molten tin. The tank comprises a floor 13, side walls 14 and end walls 15. The side walls 14 and end walls 15 are integral with each other and with the floor 13. The level of the surface of the bath 12 is indicated at 16 in FIGURE 1.

The tank structure supports a roof structure bridging the bath 12 and including a roof 17, end walls 18 and 19 and side walls 20 so that the roof structure provides a tunnel over the bath 12 and defines a head space over the bath into which head space non-oxidising gas is fed through ducts 20a to prevent the formation in the bath of contaminants for the glass.

The end wall 18 at the inlet end of the tank extends downwardly into the tank structure and defines an inlet 21 through which a formed ribbon of glass 22 is delivered by the casting rolls 6 and 7 to the bath. The end wall 19 of the roof structure at the outlet end of the tank defines with the end wall 15 an outlet 23 through which a cooled ribbon of glass is taken undamaged from the molten bath 12 by mechanical means.

At the inlet end of the tank an extension 24 of the roof 17 is provided and forms with the gate 10 a chamber enclosing the casting rolls 6 and 7, this chamber further comprising side walls 25 carried by the side walls 14 of the tank.

The temperature of the bath at the inlet end of the tank is maintained by heaters 26 in the head space over the bath and heaters 27 immersed in the bath, at a temperature of 1,000° C. or higher for soda-lime glass. This temperature is such that the formed ribbon of glass 22 delivered to the bath melts on the surface of the bath as it is advanced to form a buoyant layer of molten glass 28. This buoyant layer is confined between and engages surfaces wettable by the molten glass and comprised in the side walls of the tank, the surfaces extending longitudinally of the bath. The surfaces may be of a material which is wettable by molten glass, for example the usual refractory material used in glass melting tanks.

In the preferred embodiment described these linear surfaces on each side of the tank comprise two series of tiles 29 and 30 of wettable refractory material which have a partly curved cross-section as illustrated in FIGURE 3, and which are held in longitudinally extending grooves 31 and 32 extending along the side walls 14 of the tank at the surface level of the bath. The height dimension of the tiles 29 and 30 is such that the bottom of the tiles is immersed in the bath 12 and the top rises above the level of the molten glass 28. The tiles 29 and 30 are pressed into the grooves by the pressure of the molten glass and are held in position by guide covers 33 and 34 fixed to the side walls 14 of the tank by bolts 33a and 34a. The tiles of each series of tiles abut each other and may be joined, for example, by abutting scarf joint surfaces, and the tiles are fed into the grooves down downwardly sloping ramps, one of which is indicated at 35. The ramps have associated side walls which form channels therewith, and the channels terminate beneath the surface 16 of the bath so that the tiles are floated into the grooves 31 and 32.

Tile feeding means, for example, a belt 36 extending between two pulleys 37 and 38 is associated with each ramp and tiles are placed at the inlet end of the belt in abutting relation and are driven forward by the belt at a constant velocity. Because the tiles abut each other the belt drives the linear series of tiles down the groove at a constant velocity, and this velocity is regulated by regulating the drive to the pulleys 37 and 38 so that a substantially uniform velocity is maintained across the whole width of the layer of molten glass as it is advanced down the bath of molten metal.

The drives for feeding both the series of tiles are synchronised so that the tiles are advanced simultaneously down the bath at the same velocity at both sides of the tank. Because the tiles are wetted by the molten glass the edges of the layer are carried down at the velocity of the tiles and there is no "herring-bone" distortion of the glass due to drag at the edges of the layer.

Thermal regulators 39 are provided down the bath and maintain a temperature gradient down to about 650° C. at the outlet end of the tank so that the layer of glass between the tiles 29 and 30 is progressively cooled as it is advanced along the bath. The temperature at the outlet end of the bath is such that the glass can be taken unharmed from the bath on to lehr rollers 40 by a takeoff roller 41.

The tiles 29 and 30 are detached from the sides of the ribbon of glass before the ribbon is taken out of the tank and one way of effecting this is illustrated diagrammatically in FIGURES 1 and 2.

When the ribbon of glass on the bath has been cooled sufficiently so that it is stiff enough to hold its form the glass is gripped by sharp edged wheels 42 and 43 mounted on spindles 44 and 45. The wheels 42 and 43 at each side of the tank are spaced in from the path of the tiles 29 and 30, and the sharp edged rims of the wheels almost meet so that as the glass is passed between the pairs of wheels 42 and 43 while it is still deformable the wheels make a deep groove 46 along both faces of each margin of the glass but do not quite sever the tiles from the ribbon of glass. As the ribbon is taken off the bath by the take-off roller 41, the ribbon is severed from the tiles along the grooves 46 and the tiles are taken out of the bath through separate channels for cleaning and returning to the input end of the tank.

Alternatively the tiles 29 and 30 may be detached from the ribbon by the use of localised flame heaters which heat the margins of the ribbon of glass where it is attached to the tiles and permit the tiles to be forced into separate channels and detached from the ribbon as the ribbon is moved on to the lehr rolls by the take-off roller 41.

If the tiles are severed from the glass as soon as the glass is sufficiently stiff to hold its form and its thickness which has developed between the tiles, then the glass can be attenuated and its thickness reduced to a desired thickness by maintaining the glass, as it is advanced along the bath, in a transitional plastic state after the tiles have been detached and subjecting the plastic glass to controlled attenuation by imposing a longitudinally directed tractive force on the glass from the lehr rolls. This force causes the plastic glass to accelerate so that its thickness is decreased to a predetermined extent while the pristine flatness of the molten layer 28 is maintained in the attenuated glass.

As the plastic glass is attenuated both the width and thickness of the ribbon decrease, and the temperature gradient down the bath is regulated so that when the plastic glass has reached the required thickness it is again just stiff enough to hold its dimensions, so that the ribbon is stabilised. The stabilised ribbon is then sufficiently cooled to permit it to be taken unharmed from the bath.

This is illustrated in FIGURE 4 which shows diagrammatically the attenuation of the ribbon of glass after the tiles have been removed. The severed tiles are not shown in the drawing. The ribbon of glass after the tiles have been removed passes under a partition 47 extending across the tank and downwardly from the roof 17. The temperature of the glass as it passes under the partition 47 is about 850° C. for a soda-lime glass.

A second partition 48 extending across the tank and downwardly from the roof 17 defines with the partition 47 a zone in which heaters are mounted in the head space over the bath and in the molten metal to maintain a temperature gradient down the bath from the partition 47 to the partition 48 such that the layer is maintained in a transitional plastic state as it is advanced through this zone. The glass in a transitional plastic state is indicated at 49 and in the plastic state the dimensions of the glass 49 are no longer controlled by forces of surface tension and gravity so that the plastic glass 49 can be subjected to controlled attenuation by imposing a longitudinally acting tractive force on the plastic glass.

The temperature at the partition 48 is about 700° C. so that the ribbon of glass emerging from under the second partition 48 is sufficiently stiff to hold its form, that is its dimensions are stabilised. The stabilised ribbon is progressively cooled to about 650° C. when it reaches the outlet end of the bath to permit the cooled ribbon to be taken unharmed from the bath.

Tractive force is applied to the cooled ribbon by the rollers 40 and this tractive effort from the lehr is sufficient to maintain the ribbon moving along the bath and also to apply the tractive force necessary to accelerate the plastic glass 49 and so to cause controlled attenuation of the plastic glass. The tractive force is ultimately dissipated in the plastic glass and the controlled attenuation of the plastic glass causes progressive decrease in its width and thickness to a predetermined extent exemplified by the tapering form of the glass 49 shown in FIGURE 4.

There is thus produced a ribbon of glass which is thinner than the molten layer of glass developed between the wettable tiles but which has all the properties of the glass developed between the tiles, namely flat parallel surfaces and freedom from distortion.

An alternative method of reducing the thickness of the glass layer formed between the wettable surfaces is illustrated in FIGURES 5 and 6. After the tiles have been detached from the glass the cooling of the glass is continued until the glass has stiffened sufficiently to be capable of being gripped. In FIGURES 5 and 6 the glass from which the tiles have just been detached is indicated at 50 and this ribbon of glass 50 passes under a partition 51 extending across the tank and downwardly from the roof 17. The partition 51 defines with a second partition 52 a zone enclosed in a chamber. Water cooled boxes 53 are mounted in the zone between the side walls 14 of the tank structure and over the path of the glass. Each of the water cooled boxes 53 is of a rectangular section and has a flat lower surface which absorbs heat radiated from the glass as it is advanced under the boxes so that the ribbon is cooled to stiffen it sufficiently to be capable of being gripped. Water is supplied to and exhausted from the boxes 53 by pipes 54 which also support the boxes 53 on the side walls 14.

The cooled stiffened ribbon of glass 55 which emerges from under the boxes 53 is gripped by two pairs of edge rolls 56 and 57 respectively mounted at oppositely disposed locations across the tank. The lower roll of each pair is immersed in the bath 12 and the upper roll of each pair is arranged above the surface of the bath so that the edges of the stiffened ribbon 55 are gripped between the rolls as indicated in FIGURE 5. The axes of the rolls 56 and 57 are perpendicular to the direction of travel of the stiffened ribbon 55. Driving means connected to the rolls 56 and 57 is operable to control their speeds, the rollers rotating in the directions of the arrows indicated in FIGURE 6, thereby to effect a control of the velocity of the stiffened ribbon 55 along the bath. The gripping of the stiffened ribbon 55 by the edge rolls 56 and 57 provides a barrier to resist the transmission of longitudinal acceleration forces to the layer of molten glass 28 formed between the wettable tiles 30.

The speed at which the rolls 56 and 57 are driven may be such that the velocity of the stiffened ribbon 55 along the bath is the same as the velocity of advance of the layer of molten glass 28. Alternatively the speed of rotation of the rolls 56 and 57 may be such that the velocity of the stiffened ribbon 55 along the bath is slightly greater than the velocity of advance of the layer 28 so that there will be a slight tapering of the layer 28 after the tiles have been severed and as it approaches the partition 51.

The stiffened ribbon 55 passes under the partition 52 into a second zone enclosed in a chamber defined between the partition 52 and a third partition 58 extending across the tank and downwardly from the roof. In the head space of this zone there is a concentration of heaters 59 and there is a corresponding concentration of heaters 60 immersed in the bath 12 between the partitions 52 and 58.

The stiffened ribbon 55 is at a temperature of about 700° C. when it passes under the partition 52 and the temperature gradient between the partitions 52 and 58 is such that the ribbon is progressively reheated during its passage through this zone to about 850° C. for a soda-lime glass. Thus as the glass passes through this zone it is progressively reheated to a transitional plastic state in which it is capable of being subjected to controlled attenuation, although it is not so hot that forces of surface tension and gravity play any substantial part in determining the dimensions of the ribbon 61 in a plastic state.

The plastic glass 61 is subjected to controlled attenuation to reduce its thickness by a predetermined amount in the manner described above with reference to FIGURE 4, the longitudinally directed tractive force imposed on the plastic glass 61 by the lehr rollers being sufficient to maintain the ribbon of glass moving along the bath surface and also to apply the tractive force required to accelerate the plastic glass to cause the desired reduction in its thickness. The tractive force is partly dissipated in the attenuation of the plasitc glass 61, and the stiffened ribbon 55 and gripping rolls 56 and 57 form a barrier which resists the transmission of longitudinal forces to the layer of glass 28 between the wettable tiles.

The width of the ribbon of glass emerging from under the partition 58 is controlled by the application of tensile forces developed transversely of the plastic ribbon by two pairs of auxiliary edge rolls 63 and 64 which are respectively mounted at oppositely disposed locations just downstream of the partition 58 and which grip the edges of the plastic ribbon emerging under the partition 58 to control and maintain the width of the plastic ribbon as its thickness is further decreased.

The axes of the edge rolls 63 and 64 are inclined to the direction of travel of the ribbon and the rolls rotate in the direction of the arrows indicated in FIGURE 6. Thermal regulators 65 immersed in the bath 12 and thermal regulators 66 in the head space over the bath between partition 58 and the end wall 19 regulate the temperature in this end zone by creating a temperature gradient down to about 650° C. at the outlet 23 so that the plastic ribbon leaving the edge rolls 63 and 64 is stabilised and the stabilised ribbon is then sufficiently cooled to permit it to be taken unharmed from the bath by the lehr rollers 40 and 41.

The edge rolls 63 and 64 may be free-running or may be driven in a direction to assist in the advancing of the ribbon, for example they may be driven at a higher speed than the rolls 56 and 57 in order to assist the attenuation of the plastic glass.

It will be understood that the auxiliary edge rolls 63 and 64 can be supplemented by further pairs of auxiliary edge rolls so that a progression of edge rolls is employed along the edges of the plastic glass to control its width during the attenuation of the plastic glass, successive pairs of edge rolls being driven at progressively increasing velocities to accelerate the plastic glass as it is advanced.

The pristine flatness of the layer 28 of molten glass is maintained in the cooled ribbon taken from the glass which ribbon is free from distortion, has flat parallel surfaces and a fire finish lustre.

Instead of regulating the delivery of glass to the bath by feeding the ribbon of glass of predetermined dimensions to the bath at a controlled rate glass in molten form may be supplied to the bath directly from the spout 4 of the forehearth 1, the rate of flow of the glass from the spout being such that the required thickness of the molten body 28 of glass is produced between the tiles 29 and 30.

Although it is preferred to sever the tiles from the ribbon of glass while it is still on the surface of the bath, it will be apparent that by suitable design of the lehr rollers the cooled ribbon of glass can be taken from the bath with the tiles still attached to it, and the tiles can be detached from the ribbon by any suitable mehod in the lehr, for example by cutting, or cracking with a hot wire.

In the foregoing general description of the preferred embodiment of the invention a reference is made to mounting as mobile units refractory elements formed of the usual refractory material employed in glass melting tanks but in order to avoid marginal distortions of the glass in the layer being advanced along the bath by reason of small variations in the linear speed of the mobile units or the layer as the case may be, the mobile units may be formed of a non-wettable refractory material, for example, graphite, which necessitates a plenum of non-oxidising gas being maintained in the head space over the layer of glass.

By the herein described method of manufacturing flat glass in ribbon form there is produced glass having a lustrous finish such as is normally associated with vertically drawn glass and which is free from distortions such as occur in the known rolling and drawing methods of producing flat glass, the glass having any desired thickness which is determined by the rate at which glass is delivered to the bath, the distance between the wettable surfaces which are simultaneously moved with the glass at the same velocity as the glass down the bath, and the tractive force imposed on the glass when in a plastic state from the lehr to which the cooled ribbon of glass is delivered.

The present invention also comprehends, as a new article of manufacture, the flat glass produced in continuous ribbon form on a bath of molten metal between mobile wettable or non-wettable surfaces, and articles worked up from such glass.

I claim:

1. A method of manufacturing flat glass in ribbon form by delivering glass at a controlled rate to a bath of molten metal confined against longitudinal movement to establish a buoyant layer of molten glass on the bath, confining said buoyant layer of molten glass between surfaces extending longitudinally of the bath, the molten glass engaging said surfaces, advancing the buoyant layer along and relative to the surface of the bath, simultaneously advancing the confining surfaces with the glass along the bath at the same speed as the glass to maintain a uniform velocity across the whole width of the layer, and then cooling the layer sufficiently to enable it to be taken in ribbon form unharmed from the bath.

2. Apparatus for manufacturing flat glass of desired thickness from a layer of molten glass, comprising a tank structure containing a bath of molten metal, and having means for confining the bath against movement along the tank, means for confining the molten glass at the sides of the tank comprising at least at the surface level of the bath mobile surfaces for engagement by the molten glass, which surfaces are movable along the side walls of the tank at a constant speed, means for delivering glass at a controlled rate to the bath and advancing the glass along and relative to the surface of the bath as a layer of molten glass extending between and engaging said mobile surfaces, driving means for said glass confining means for advancing said confining surfaces along the tank at the same speed as that of the molten glass to maintain uniform velocity of the glass across the whole width of the layer, and thermal regulators in the bath to cool the glass as it is advanced until it can be taken unharmed from the bath.

References Cited by the Examiner

UNITED STATES PATENTS

| | | | |
|---|---|---|---|
| 710,357 | 9/1902 | Heal | 65—258 |
| 1,489,852 | 4/1924 | Rowley | 65—91 |
| 1,548,435 | 8/1925 | Bock | 65—176 |
| 2,618,012 | 11/1952 | Milne | 65—200 X |
| 2,668,988 | 2/1954 | Bailey et al. | 18—48 X |
| 2,689,982 | 9/1954 | Cheynoweth | |

DONALL H. SYLVESTER, *Primary Examiner.*

D. CRUPAIN, *Assistant Examiners.*